United States Patent
Nomura et al.

(10) Patent No.: US 10,585,184 B2
(45) Date of Patent: Mar. 10, 2020

(54) TRACKING PROCESSOR AND METHOD OF TRACKING PROCESSING

(71) Applicant: Furuno Electric Co., Ltd., Nishinomiya (JP)

(72) Inventors: Hiroyuki Nomura, Nishinomiya (JP); Kazuya Nakagawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 193 days.

(21) Appl. No.: 15/528,700

(22) PCT Filed: Oct. 8, 2015

(86) PCT No.: PCT/JP2015/078625
§ 371 (c)(1),
(2) Date: May 22, 2017

(87) PCT Pub. No.: WO2016/084498
PCT Pub. Date: Jun. 2, 2016

(65) Prior Publication Data
US 2017/0261608 A1  Sep. 14, 2017

(30) Foreign Application Priority Data
Nov. 28, 2014 (JP) .................................. 2014-241908

(51) Int. Cl.
*G01S 13/72* (2006.01)
*G01S 7/22* (2006.01)
(Continued)

(52) U.S. Cl.
CPC ............. *G01S 13/726* (2013.01); *G01S 7/22* (2013.01); *G01S 13/449* (2013.01); *G01S 13/723* (2013.01); *G08G 3/02* (2013.01)

(58) Field of Classification Search
CPC ................................ G01S 13/726; G01S 7/22
(Continued)

(56) References Cited

U.S. PATENT DOCUMENTS 5,400,264 A    3/1995   Phillis et al.
7,315,274 B2 * 1/2008   Fossum .................. G01S 13/82
                                                  342/44
(Continued)

FOREIGN PATENT DOCUMENTS

CN    102393901 A    3/2012
JP    2001242242 A   9/2001
(Continued)

OTHER PUBLICATIONS

European Patent Office, Supplementary European Search Report Issued in Application No. 15862592.1, dated Jun. 15, 2018, Germany, 9 pages.
(Continued)

*Primary Examiner* — Marcus E Windrich
(74) *Attorney, Agent, or Firm* — Alleman Hall Creasman & Tuttle LLP

(57) ABSTRACT

This disclosure aims to accurately track a tracking target regardless of a surrounding environment. A tracking processor may be provided, which includes a tracking processing module configured to perform processing of tracking a tracking target, and a congestion degree calculating submodule configured to calculate a degree of congestion of objects located within an area including an estimated position of the tracking target. The tracking processing module may perform the processing of tracking the tracking target based on a value of the congestion degree calculated by the congestion degree calculating submodule.

8 Claims, 7 Drawing Sheets

(51) Int. Cl.
*G01S 13/44* (2006.01)
*G08G 3/02* (2006.01)

(58) Field of Classification Search
USPC .......................................................... 342/41
See application file for complete search history.

(56) References Cited

U.S. PATENT DOCUMENTS

| | | | |
|---|---|---|---|
| 8,836,570 B2* | 9/2014 | Ponsford | G01S 13/9307 340/984 |
| 9,075,142 B2 | 7/2015 | Takemoto | |
| 2008/0193009 A1* | 8/2008 | Sonoura | G01S 5/0294 382/153 |
| 2009/0052740 A1* | 2/2009 | Sonoura | G06K 9/32 382/103 |
| 2014/0118187 A1 | 5/2014 | Nakagawa | |
| 2014/0139361 A1 | 5/2014 | Arnold et al. | |
| 2015/0019161 A1 | 1/2015 | Moriguchi et al. | |

FOREIGN PATENT DOCUMENTS

| | | |
|---|---|---|
| JP | 2001296354 A | 10/2001 |
| JP | 2007068008 A | 3/2007 |
| JP | 2009052940 A | 3/2009 |
| JP | 2009271086 A | 11/2009 |
| JP | 2013152157 A | 8/2013 |
| JP | 2014085274 A | 5/2014 |
| JP | 2014089056 A | 5/2014 |
| JP | 2014102256 A | 6/2014 |
| WO | 2013128852 A1 | 9/2013 |

OTHER PUBLICATIONS

ISA Japan Patent Office, International Search Report Issued in Application No. PCT/JP2015/078625, dated Dec. 22, 2015, WIPO, 2 pages.
China National Intellectual Property Administration, Office Action and Search Report Issued in Application No. 201580059386.6, dated Dec. 30, 2019, 6 pages.

* cited by examiner

| | |
|---|---|
| FLAG | 201 |
| DISTANCE rp | 202 |
| ENDING ANGLE θe | 203 |
| ANGULAR WIDTH θw | 204 |
| FOREFRONT EDGE DISTANCE rn | 205 |
| REARMOST EDGE DISTANCE rf | 206 |
| AREA ar | 207 |
| REPRESENTATIVE POINT P | 208 |
| ECHO LEVEL ec | 209 |
| ADJACENT DISTANCE ad | 210 |
| DOPPLER SHIFT AMOUNT ds | 211 |
| TIME tm | 212 |

FIG. 3

TRACKING PROCESSOR AND METHOD OF TRACKING PROCESSING

TECHNICAL FIELD

This disclosure relates to a tracking processor and a method of tracking processing, in which a tracking target is tracked.

BACKGROUND ART

Patent Document 1 discloses an example of conventionally known tracking processors, which estimates a motion state of a target which is a tracking target, and tracks the target based on the motion state. Thus, an object desired to be tracked can be detected accurately from a plurality of objects.

REFERENCE DOCUMENT OF CONVENTIONAL ART

Patent Document

Patent Document 1: JP2014-089056A

DESCRIPTION OF THE DISCLOSURE

Problem to be Solved by the Disclosure

Incidentally, when tracking the target which is the tracking target as described above, the target may not be tracked accurately depending a surrounding environment of the target.

This disclosure is to solve the above problem and aims to accurately track a tracking target regardless of a surrounding environment.

SUMMARY OF THE DISCLOSURE (1) In order to solve the problem described above, according to one aspect of the present disclosure, a tracking processor may be provided, which includes a tracking processing module configured to perform processing of tracking a tracking target, and a congestion degree calculating module configured to calculate a degree of congestion of objects located within an area including an estimated position of the tracking target. The tracking processing module may perform the processing of tracking the tracking target based on a value of the congestion degree calculated by the congestion degree calculating module.

(2) The congestion degree calculating module may calculate the congestion degree based on the number of objects located within the area.

(3) Moreover, the tracking processor may further include an echo distribution generating submodule configured to count the number of objects located in a plurality of cells formed by dividing the area on a single cell basis, and store the number of objects counted for each of the plurality of cells in association with the cell. The congestion degree calculating module may calculate the congestion degree of the objects located in the cell including the estimated position of the tracking target.

(4) The congestion degree calculating module may calculate the congestion degree based on the numbers of objects obtained at a plurality of timings.

(5) The congestion degree calculating module may calculate a smoothed congestion degree based on the congestion degrees obtained at a plurality of timings. The tracking processing module may perform the processing of tracking the tracking target based on the smoothed congestion degree calculated by the congestion degree calculating module.

(6) The tracking processing module may set a gain used in performing tracking filtering on an observed position obtained by observing the tracking target, based on the value of the congestion degree.

(7) The tracking processing module may include a selecting submodule configured to specify a selected region where the observed position obtained by observing the tracking target is estimated to be located. The tracking processing module may set the area of the selected region based on the value of the congestion degree.

(8) In order to solve the problem described above, according to another aspect of the present disclosure, a method of tracking processing may be provided, which includes performing processing of tracking a tracking target, and calculating a degree of congestion of objects located within an area including an estimated position of the tracking target. The performing the processing of tracking the tracking target may include performing the processing of tracking the tracking target based on a value of the congestion degree.

Effects of the Disclosure

According to the present disclosure, it is possible to accurately track a tracking target regardless of a surrounding environment.

BRIEF DESCRIPTION OF DRAWINGS

FIG. 3 is a data list illustrating data extracted with respect to the object echo image (object).

MODES FOR CARRYING OUT THE DISCLOSURE

Figure 1:
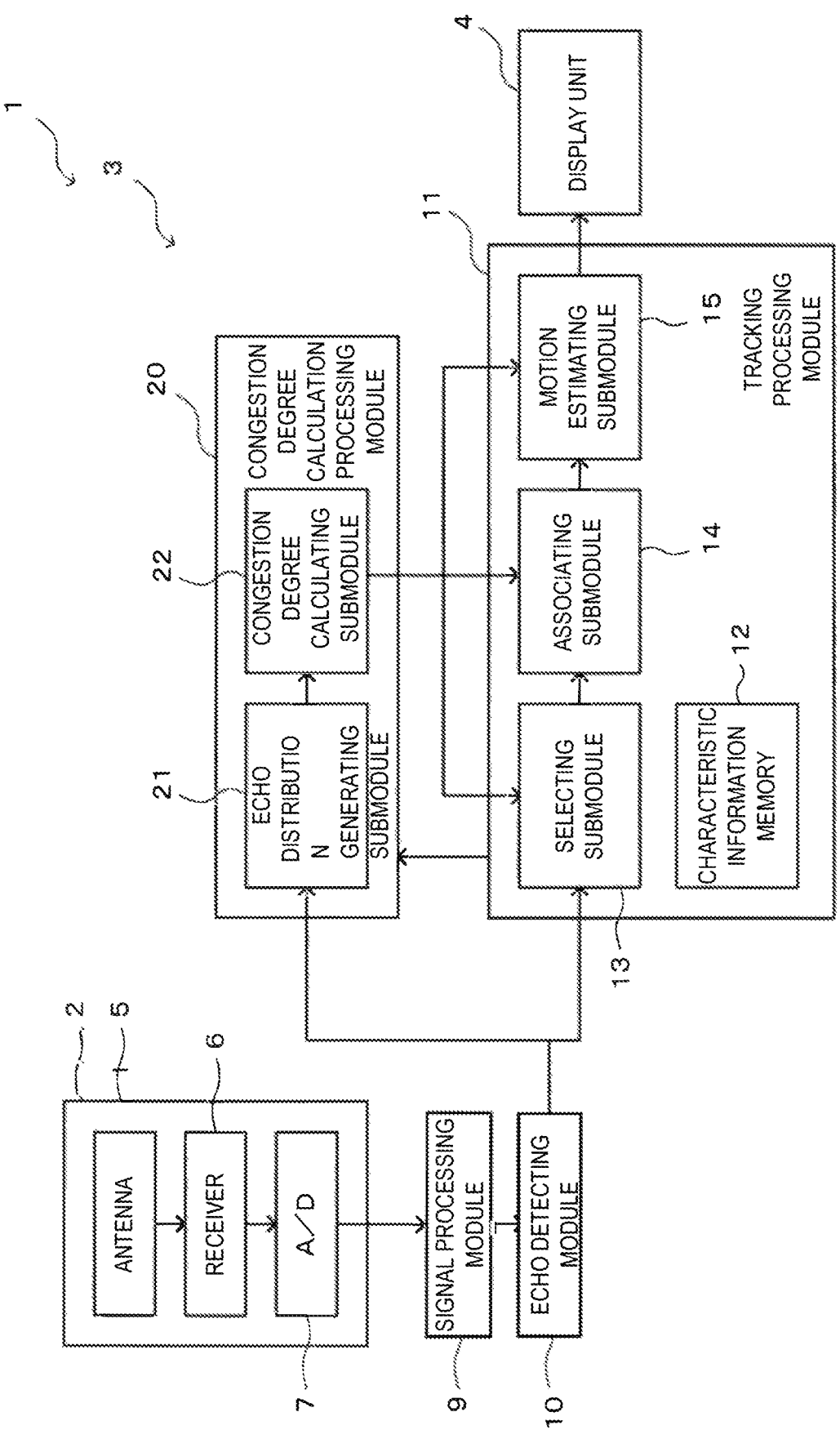
FIG. 1 is a block diagram illustrating a radar apparatus including a tracking processor according to one embodiment of this disclosure.

Hereinafter, one embodiment of a tracking processor 3 according to this disclosure is described with reference to the drawings. This disclosure is broadly applicable as a tracking processor which tracks an object selected as a tracking target. Hereinafter, a target which is set as the tracking target is referred to as "a tracking object." Additionally, the same or corresponding parts are denoted with the same reference characters in the drawings, and the description thereof is not repeated below.

FIG. 1 is a block diagram illustrating a radar apparatus 1 including a tracking processor 3 according to one embodiment of this disclosure. The radar apparatus 1 of this embodiment may be, for example, a ship radar equipped in a ship (e.g., fishing boat). The radar apparatus 1 may mainly be used to detect an object (e.g., another ship). Further, the radar apparatus 1 may be configured to be capable of tracking an object selected as a tracking object. The radar apparatus 1 may be configured to be capable of tracking a plurality of tracking objects simultaneously. The radar apparatus 1 may be configured to estimate a motion state of each tracking object. In this embodiment, the radar apparatus 1 may calculate a smoothed velocity of the tracking object as the motion state. The smoothed velocity is a vector indicating an estimated traveling direction and an estimated traveling speed of the tracking object. The radar apparatus 1 may display the smoothed velocity of the tracking object on a display screen. Note that the ship equipped with the radar apparatus 1 may be referred to as "the one ship" below.

As illustrated in FIG. 1, the radar apparatus 1 may include an antenna unit 2, the tracking processor 3, and a display unit 4.

The antenna unit 2 may include an antenna 5, a receiver 6, and an A/D converter 7.

The antenna 5 may be a radar antenna capable of transmitting a pulse-shaped radio wave with a high directivity. Further, the antenna 5 may be configured to receive an echo signal which is a reflection wave from an object. In other words, the echo signal of the object is a reflection wave caused by a transmission signal from the antenna 5, reflected on the object. The radar apparatus 1 may measure a time length from a transmission of the pulse-shaped radio wave to a reception of the echo signal. Thus, the radar apparatus 1 may detect a distance r to the object therefrom. The antenna 5 may be configured to be rotatable of 360° on a horizontal plane. The antenna 5 may be configured to repeat the transmission and reception of the radio wave while changing the transmitting direction of the pulse-shaped radio wave (changing the antenna angle). With the above configuration, the radar apparatus 1 may detect object(s) on a plane 360° around the one ship.

Note that, in the following description, an operation starting from a transmission of the pulse-shaped radio wave to the next transmission of the pulse-shaped radio wave may be referred to as "one sweep" and an operation of rotating the antenna 360° while performing the transmission and reception of the radio wave may be referred to as "one scan." Hereinafter, a certain scan is referred to as "n-th scan," and a scan immediately previous to the n-th scan is referred to as "(n−1)-th scan." Note that "n" may be a natural number. Moreover, the operation of the radar apparatus 1 described below is for the timing of the n-th scan, unless otherwise explained regarding the operation.

The receiver 6 may detect and amplify the echo signal received by the antenna 5. The receiver 6 may output the amplified echo signal to the A/D converter 7. The A/D converter 7 may sample an analog echo signal and convert it into digital data (echo data) composed of a plurality of bits. Here, the echo data may include data indicating an intensity (signal level) of the echo signal received by the antenna 5. The A/D converter 7 may output the echo data to the tracking processor 3.

The tracking processor 3 may be configured to perform tracking processing in which a tracking object is tracked by specifying an object selected from among a plurality of objects as the tracking object and performing tracking filtering on an observed position obtained by observing the tracking object. More specifically, the tracking processor 3 may be configured to calculate a smoothed velocity of the tracking object, an estimated position (smoothed position) of the tracking object, etc.

The tracking processor 3 may be configured using hardware including a CPU, a RAM, a ROM (not illustrated), etc. In addition, the tracking processor 3 may be configured using software including a tracking processing program stored in the ROM.

The tracking processing program may cause the tracking processor 3 to execute a tracking processing method according to this disclosure. The hardware and the software may be configured to operate in cooperation with each other. Thus, the tracking processor 3 may function as a signal processing module 9, an echo detecting module 10, a tracking processing module 11, etc. The tracking processor 3 may be configured to perform the processing described below for each scan.

The tracking processor 3 may include the signal processing module 9, the echo detecting module (detection unit) 10, the tracking processing module 11, and a congestion degree calculation processing module 20.

The signal processing module 9 may remove an interference component and unnecessary waveform data included in the echo data by performing filtering etc. In addition, the signal processing module 9 may be configured to detect characteristic information of the echo data regarding an object echo image. The signal processing module 9 may output the processed echo data to the echo detecting module 10.

The echo detecting module 10 may be configured to detect the object echo image and the characteristic information of the echo data regarding the object echo image. Thus, the echo detecting module 10 may include an object echo image detecting submodule and a characteristic information extracting submodule. The signal detecting module 9 and the echo detecting module 10 may constitute a detection unit configured to detect the characteristic information of the object.

The echo detecting module 10 may obtain the distance r to the position corresponding to the echo data based on a read address at the time of reading the echo data from the signal processing module 9. Further, data indicating a current orientation of the antenna 5 (antenna angle θ) may be outputted from the antenna 5 to the echo detecting module 10. With the above configuration, in the echo data reading, the echo detecting module 10 may acquire the position corresponding to the echo data as polar coordinates of the distance r and the antenna angle θ.

The echo detecting module 10 may be configured to detect whether an object is located at the position corresponding to the echo data. For example, the echo detecting module 10 may determine a signal level at the position corresponding to the echo data, i.e., a signal intensity. The echo detecting module 10 may determine that an object is located at the position where the signal level is equal to or higher than a given threshold.

Next, the echo detecting module 10 may detect a range within which the object is located. For example, the echo detecting module 10 may detect a block of region where the object is located, as a region where an object echo image is located. In this manner, the echo detecting module 10 may detect the object echo image based on the echo data. The contour shape of the object echo image may substantially match with the contour shape of the object. However, due to noise or the like included in the echo data, the contour shape of the object echo image and the contour shape of the object may be slightly different. Next, the echo detecting module 10 may extract the characteristic information regarding the target echo image by using the echo data.

Figure 2:
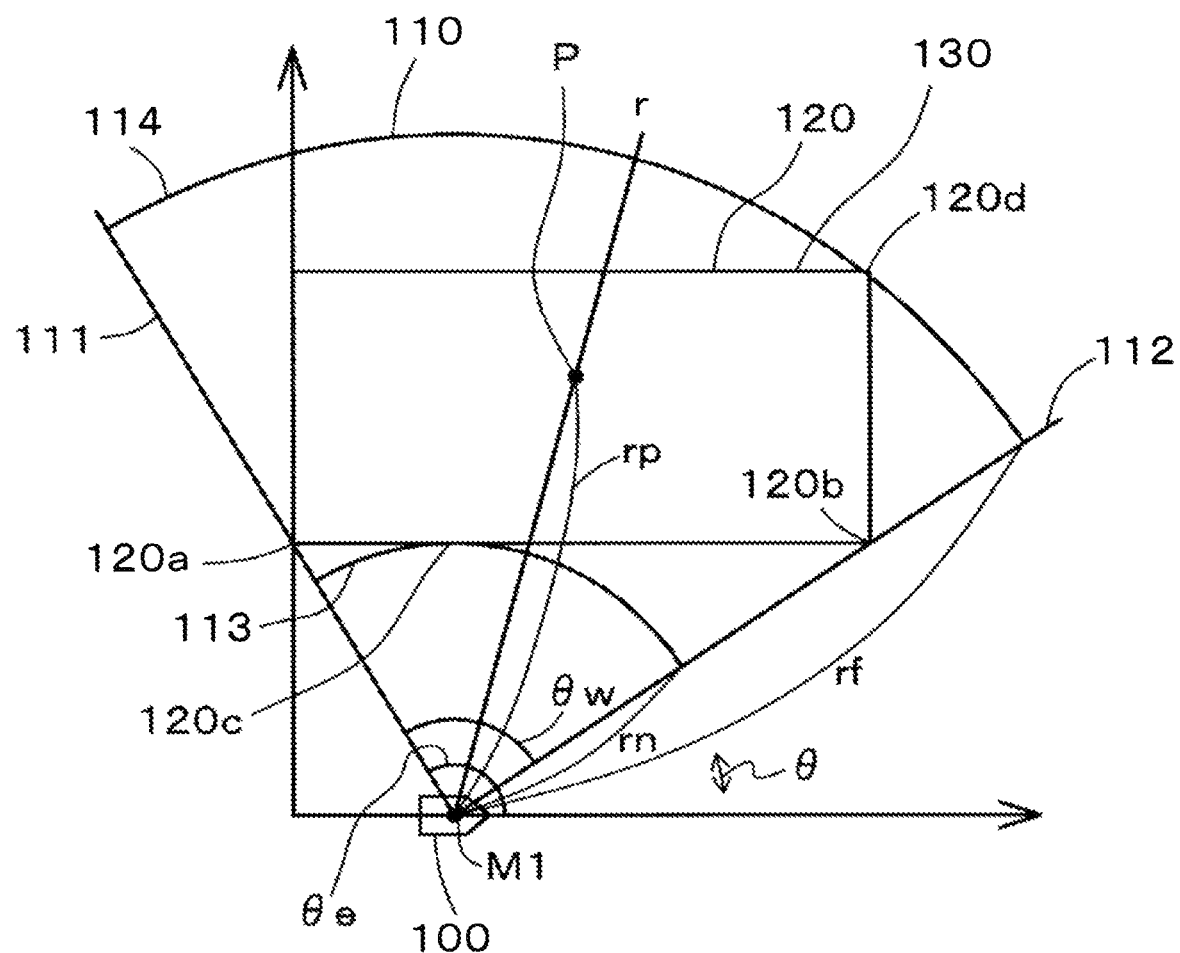
FIG. 2 is a schematic plan view illustrating a relationship between one ship and an object echo image.

FIG. 2 is a schematic plan view illustrating a relationship between the one ship 100 and an object echo image 120. FIG. 2 illustrates the object echo image 120 as a rectangular image. FIG. 2 further illustrates an object 130 specified by the object echo image 120. In FIG. 2, the contour shape of the object 130 is displayed in a state matching with the object echo image 120.

As illustrated in FIGS. 1 and 2, in the polar coordinate system, with reference to the position of the one ship 100 as a one-ship position M1, a linear distance from the one-ship position M1 is indicated as the distance r, and an angle around the one-ship position M1 is indicated as the angle θ. In this embodiment, the one-ship position M1 may correspond to a position of the antenna 5. When extracting a representative point P of the object echo image 120, the echo detecting module 10 may use an image 110 having a shape substantially of a portion of a ring centering on the one-ship position M1. This image 110 may be an image of a region surrounded by a first straight line 111, a second straight line 112, a first circular arc 113, and a second circular arc 114.

The first straight line 111 is a straight line passing a closest point to the one-ship position M1 in a rear edge 120a of the object echo image 120, and the one-ship position M1. The second straight line 112 is a straight line passing a closest point to the one-ship position M1 in a front edge 120b of the object echo image 120, and the one-ship position M1. The first circular arc 113 is an arc passing a closest portion 120c of the object echo image 120 to the one-ship position M1. The center of curvature of the first circular arc 113 is the one-ship position M1. The second circular arc 114 is an arc passing a farthest portion 120d of the object echo image 120 from the one-ship position M1. The second circular arc 114 is concentric with the first circular arc 113.

FIG. 3 is a data list illustrating data extracted with respect to the object echo image 120 (object 130). As illustrated in FIGS. 2 and 3, in this embodiment, the signal processing module 9 and the echo detecting module 10 may cooperatively operate to extract the following twelve pieces of data of the object echo image 120 (object 130), as characteristic information data. That is, the echo detecting module 10 may extract the following twelve pieces of text data based on the echo data and image data of the object echo image 120. In this embodiment, the twelve pieces of text data may be data 201 of a flag, data 202 of a distance rp, data 203 of an ending angle θe, data 204 of an angular width θw, data 205 of a forefront edge distance rn, data 206 of a rearmost edge distance rf, data 207 of an area ar (shape information), coordinate data 208 of the representative point P, data 209 of an echo level ec, data 210 of an adjacent distance (information indicating a peripheral state of the object) ad, data 211 of a Doppler shift amount ds, and data 212 of time tm.

The flag described above may indicate whether the object echo image 120 is in a given state, for example. This flag may be configured to be set to "1" or "0," for example.

The distance rp may be a linear distance from the one-ship position M1 to the representative point P of the object echo image 120. In this embodiment, the representative point P may be a center point of the image 110. The ending angle θe may be the antenna angle θ described above, at the timing when the detection of the object echo image 120 is completed. The angular width θw may be a width of the target echo image 120 in the angular direction about the one-ship position M1. At the same time, the angular width θw may also be an angle formed by the first straight line 111 and the second straight line 112. The forefront edge distance rn may be a distance between the portion 120c of the object echo image 120 and the one-ship position M1. The rearmost edge distance rf may be a distance between the portion 120d of the object echo image 120 and the one-ship position M1. The area ar may be an area of the image 110 having the shape substantially of a portion of a ring, and in this embodiment, it may be treated as the area of the object echo image 120.

The echo level ec may indicate an intensity of the echo signals indicating the object echo image 120. This intensity may be a peak intensity of the echo signals indicating the object echo image 120 or may be an average value of the intensities of the echo signals. In this embodiment, the adjacent distance ad may be, for example, a distance between two object echo images 120 adjacent to each other. The Doppler shift amount ds may be, for example, a difference between a frequency of the pulse signal radiated from the antenna 5 and a frequency of the echo signal reflected on the object 130 indicated by the object echo image 120. It is possible to obtain a relative speed between the object 130 indicated by the object echo image 120 and the one ship 100 based on the Doppler shift amount ds. The time tm may be a time point when the object echo image 120 is detected. Note that the data of the object echo image 120 may include a reserve data region. In this embodiment, the signal processing module 9 and the echo detecting module 10 may extract the twelve pieces of characteristic information described above, for each object echo image 120. All of these twelve pieces of characteristic information may be expressed by numerical values.

Figure 4:
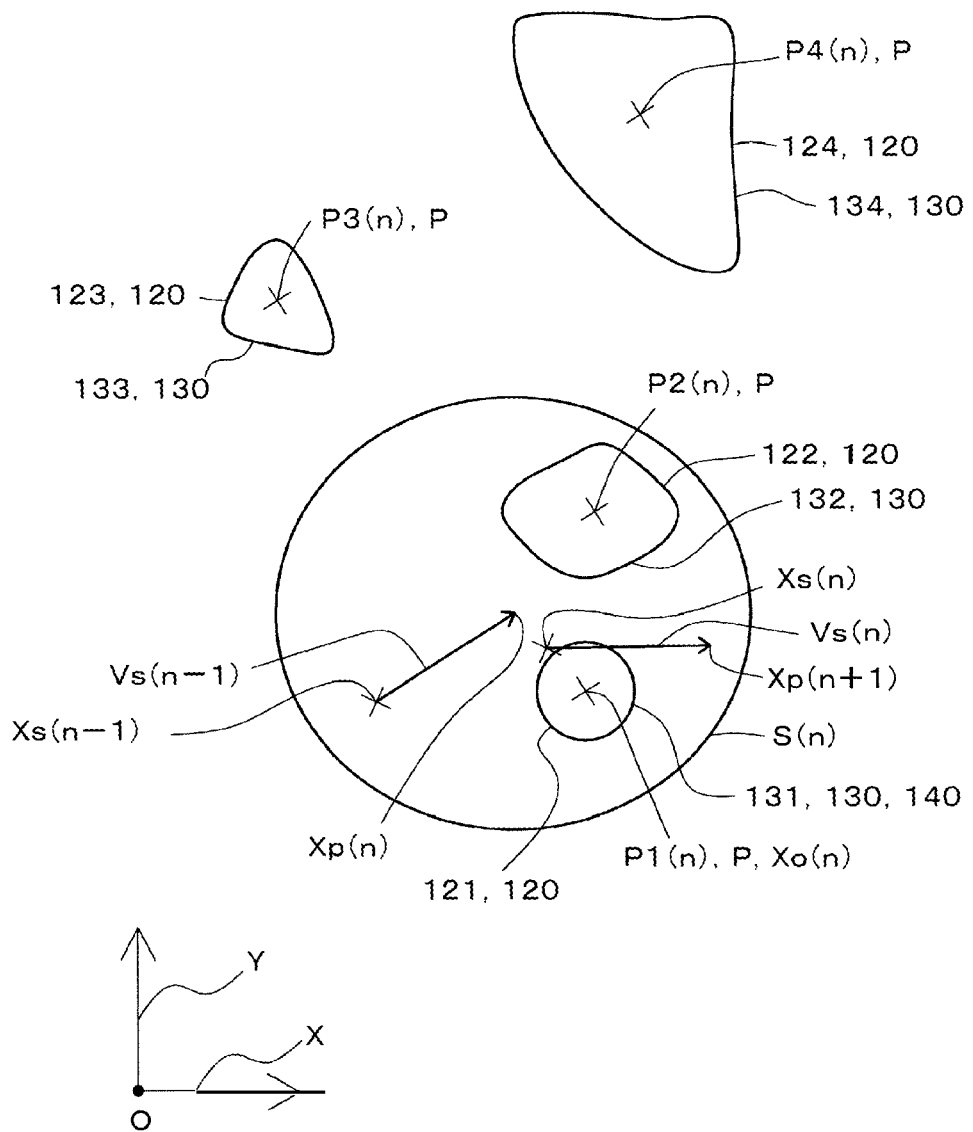
FIG. 4 is a schematic plan view illustrating the object echo image detected by an echo detecting module.

FIG. 4 illustrates an example of a plurality of object echo images 120 detected by the echo detecting module 10. FIG. 4 is a schematic plan view illustrating the object echo images 120 detected by the echo detecting module 10. FIG. 4 illustrates as an example, four object echo images 120 (121, 122, 123, 124) at the n-th scan timing. In FIG. 4, the shapes of the object echo images 120 (121, 122, 123, 124) coincide with shapes of objects 130 (131, 132, 133, 134), respectively.

The object 131 indicated by the object echo image 121, the object 132 indicated by the object echo image 122, and the object 133 indicated by the object echo image 123 may be, for example, small ships. The object 134 indicated by the object echo image 124 may be, for example, a large ship. At the n-th scan timing, the echo detecting module 10 may detect a representative point P1($n$) of the object echo image 121, a representative point P2($n$) of the object echo image 122, a representative point P3($n$) of the object echo image 123, and a representative point P4($n$) of the object echo image 124. Hereinafter, the case where the object 131 is a tracking object 140 is described as an example.

As illustrated in FIGS. 1 to 4, the echo detecting module 10 may output characteristic information data 201 to 212 of each object echo image 120 to the tracking processing module 11 and the congestion degree calculation processing module 20.

Configuration of Congestion Degree Calculation Processing Module

Figure 5:
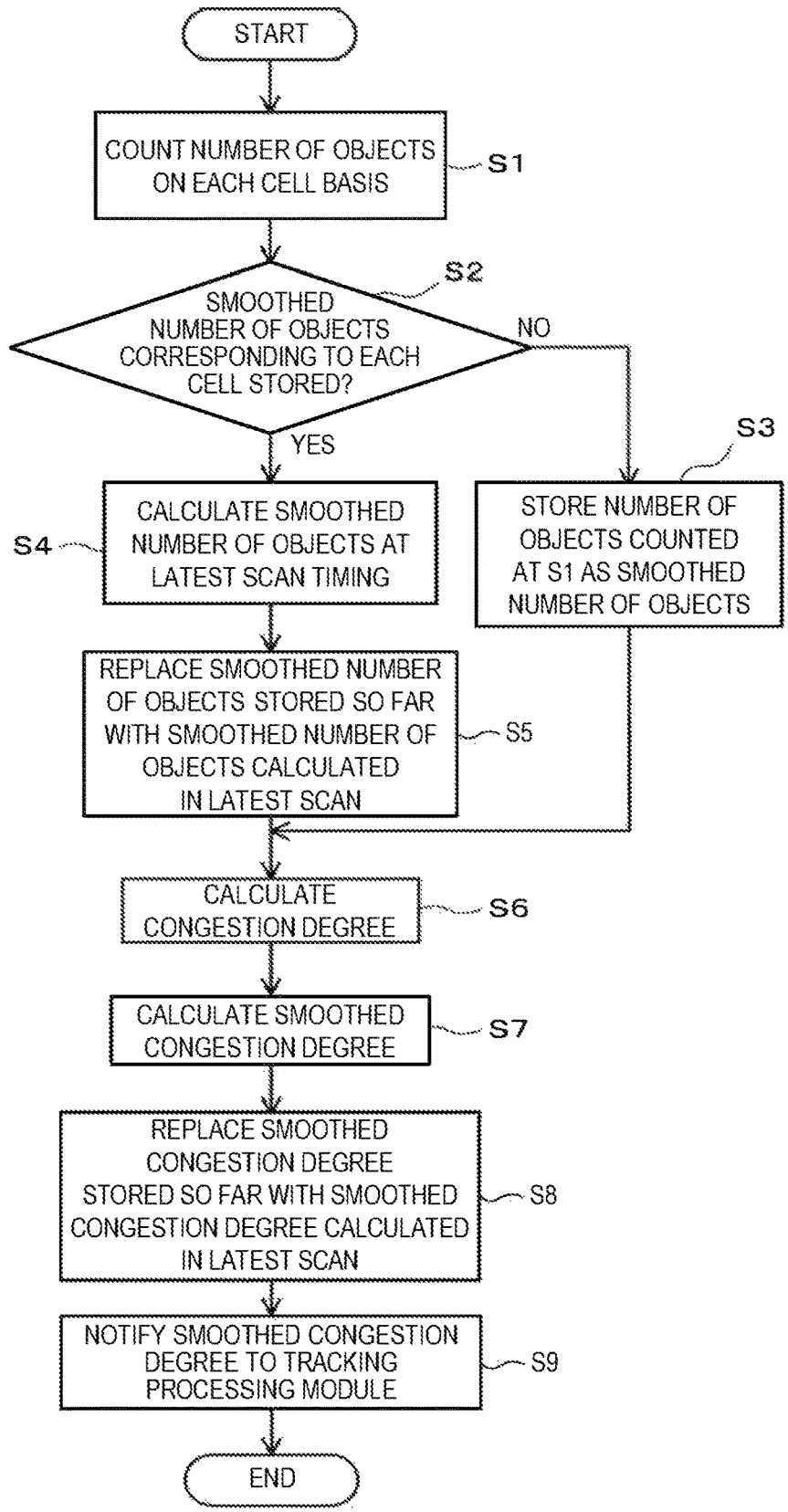
FIG. 5 is a flowchart illustrating an operation of a congestion degree calculation processing module.

FIG. 5 is a flowchart illustrating an operation of the congestion degree calculation processing module 20. Hereinafter, the configuration and operation of the congestion degree calculation processing module 20 are described with reference to FIGS. 1, 5, etc.

The congestion degree calculation processing module 20 may be configured to calculate a degree of congestion (congestion degree) of objects located around an estimated position Xp(n) of the tracking object 140. The congestion degree calculation processing module 20 may include an echo distribution generating submodule 21 and a congestion degree calculating submodule (congestion degree calculating module) 22. The congestion degree calculation processing module 20 may receive the estimated position Xp(n) in the n-th scan for the tracking object calculated by the tracking processing module 11 as described later in detail.

Figure 6:
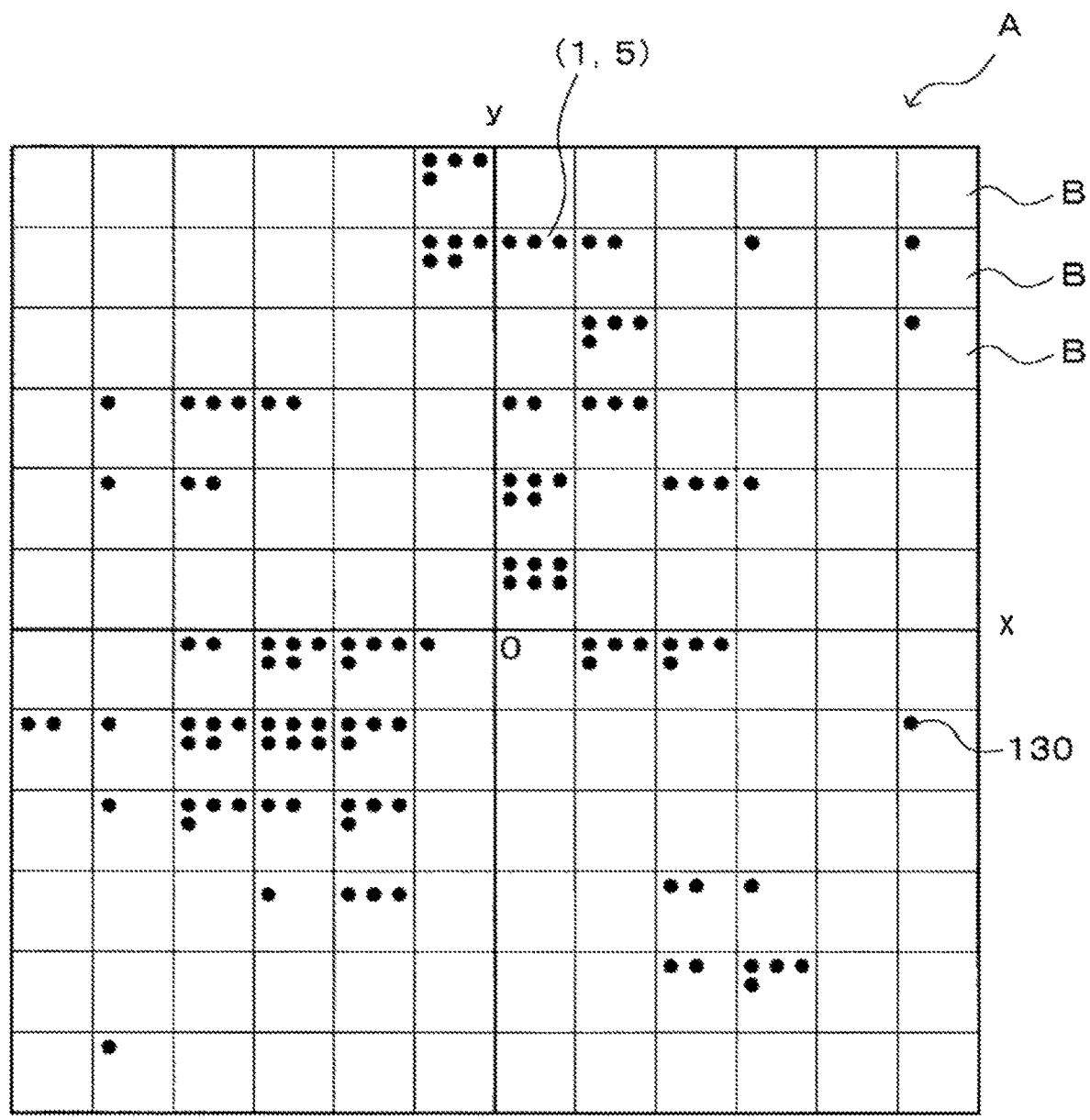
FIG. 6 is a schematic view illustrating an echo distribution generated by an echo distribution generating submodule.

FIG. 6 is a schematic view illustrating an echo distribution generated by the echo distribution generating submodule 21. The following description is given by expressing the number of objects (object number) included in a cell B of which position on xy coordinates illustrated in FIG. 6 is (x, y) in the n-th scan as N(x, y, n). For example, by referring to FIG. 6, N(1, 5, n)=3. Note that in FIG. 6, the counted number of objects is indicated by black dots. Further, although in the following description an example in which the coordinate system is the xy coordinates is described, without limiting to this, an rθ coordinate system may be used.

The echo distribution generating submodule 21 may generate a distribution of the objects 130 detected by the echo detecting module 10. For example, by referring to FIG. 6, the echo distribution generating submodule 21 may count the number of objects 130 located in a plurality of cells B formed by dividing a given area A on the sea into a lattice, on a single cell B basis (S1 in FIG. 5). Here, if the smoothed number of objects (described later in detail) corresponding to each cell B is not stored (S2: NO), the echo distribution generating submodule 21 may store the number of objects 130 counted for each cell B as the smoothed number of objects in association with the corresponding cell B (S3). Note that, as the area A, a substantially square region having a side of 64 miles may be cited as an example. Further, as the cell B, a substantially square region having a side of 0.5 mile may be cited as an example. Note that, although in this embodiment the example of counting the number of objects for each cell B is described, without limiting to this, for example, a value obtained by adding the areas of the objects included in each cell B may be used instead of the number of objects described above.

On the other hand, if the smoothed number of objects is stored corresponding to each cell B (S2: YES), the echo distribution generating submodule 21 may calculate the smoothed number of objects Ns(x, y, n) based on the smoothed number of objects Ns(x, y, n−1) stored corresponding to each cell B and the latest number of objects N(x, y, n) (S4). For example, the echo distribution generating submodule 21 may calculate the smoothed number of objects Ns(x, y, n) based on the following Equation 1.

$$Ns(x,y,n)=a_1 \cdot N(x,y,n)+(1-a_1) \cdot Ns(x,y,n-1) \quad (1)$$

Note that $a_1$ is a coefficient expressed by $0<a_1\leq1$, for example, 0.9.

Then, the echo distribution generating submodule 21 may store the smoothed number of objects Ns(x, y, n) calculated in the latest scan, in replacement of the smoothed number of objects Ns(x, y, n−1) stored so far corresponding to each cell B (S5).

The congestion degree calculating submodule 22 may calculate a congestion degree C(n) using the smoothed number of objects Ns(x, y, n) of the cell B which contains the estimated position Xp(n) of the tracking object 140 (S6). The congestion degree C(n) may be expressed as an arbitrary function having the smoothed number of objects Ns(x, y, n) as a variable, that is, C(n)=f(Ns(x, y, n)). As an example of this equation, C(n)=Ns(x, y, n) may be cited. Further, the congestion degree calculating submodule 22 may calculate a smoothed congestion degree Cs(n) based on a smoothed congestion degree Cs(n−1) which is a previously calculated congestion degree in the cell B and stored corresponding to the cell B, and a congestion degree C(n) calculated in the latest scan (S7). For example, the congestion degree calculating submodule 22 may calculate the smoothed congestion degree Cs(n) based on the following Equation 2. Moreover, the congestion degree calculating submodule 22 may store the smoothed congestion degree Cs(n) calculated in the latest scan, in replacement of the smoothed congestion degree Cs(n−1) stored so far (S8).

$$Cs(n)=a_2 \cdot C(n)+(1-a_2) \cdot Cs(n-1)-1 \quad (2)$$

Note that, when the calculation result of this equation is less than 0, the value of Cs(n) may be set to 0 (zero). Further, $a_2$ may be a coefficient expressed by $0<a_2\leq1$, for example, 0.9.

The smoothed congestion degree Cs(n) calculated by the congestion degree calculating submodule 22 may be notified to the tracking processing module 11 (S9). The tracking processing module 11 may perform tracking processing according to the value of the smoothed congestion degree Cs(n) notified from the congestion degree calculating submodule 22, which is described later in detail.

The tracking processing module 11 may be configured to specify the tracking object 140 among the plurality of objects 130 and perform tracking processing of the tracking object 140. The tracking object 140 may be selected by an operator based on, for example, symbols indicating the plurality of objects 130 displayed on the display unit 4. The selecting command for the tracking object 140 by the operator is issued, for example, by the operator controlling a user interface (not illustrated). In this embodiment, the tracking processing module 11 may be configured to perform the processing with reference to an XY coordinate system unless otherwise explained.

The tracking processing module 11 may be configured to calculate a smoothed velocity Vs(n) of the tracking object 140 at the n-th scan timing (at the latest scan timing). Further, the tracking processing module 11 may be configured to display the smoothed velocity Vs(n) on the display unit 4.

The tracking processing module 11 may include a characteristic information memory 12, a selecting submodule 13, an associating submodule 14, and a motion estimating submodule 15.

The characteristic information memory 12 may be configured to store the data outputted from the signal processing module 9 and the echo detecting module 10. The characteristic information memory 12 may store the characteristic information data 201 to 212 for all the object echo images 120 at respective timings from a (n−T)-th scan to the n-th scan. Note that the constant T may be a preset value, for example, about several tens.

The selecting submodule 13 may be configured to perform an echo selection. For example, the selecting submodule 13 may specify a region where an observed position Xo(n) (a tracking representative point of the tracking object 140) is estimated to be located, at the n-th scan timing (the latest scan timing).

Specifically, the selecting submodule 13 may refer to coordinate data of the estimated position Xp(n) of the tracking object 140 calculated by the motion estimating submodule 15. In other words, the selecting submodule 13 may acquire the coordinate data of the estimated position Xp(n) where the tracking representative point P is estimated to be located, at the n-th scan timing. The selecting submodule 13 may design a selected region S(n) centering on the estimated position Xp(n). The selected region S(n) may be, for example, a circular region centering on the estimated position Xp(n). The associating submodule 14 may search within the selected region S(n).

Here, the selecting submodule 13 may determine the range of the selected region S(n) based on the value of the smoothed congestion degree Cs(n) calculated by the congestion degree calculating submodule 22. Specifically, for example, when the smoothed congestion degree Cs(n) is equal to or lower than a given threshold $N_4$, the selecting submodule 13 may set the radius of the selected region S(n) as r1. On the other hand, when the smoothed congestion degree Cs(n) exceeds the given threshold $N_4$, the selecting submodule 13 may set the radius of the selected region S(n) as r2 which is smaller than r1.

The associating submodule 14 may specify the observed position Xo(n) of the tracking object 140 from among the tracking representative point P of one or more object echo images located within the selected region S(n), based on a likelihood of each tracking representative point P which is calculated on the basis of object information (echo area, position error, etc.) obtained previously.

Specifically, for example, the associating submodule 14 may calculate a plurality of likelihoods $Lh_n$ (n=1, 2, ...) for each tracking representative point P and output, as the observed position Xo(n) of the tracking object 140, the tracking representative point P with a highest joint likelihood obtained by combining the likelihoods $Lh_n$, to the motion estimating submodule 15. Note that the likelihood $Lh_n$ described above is a degree of likelihood of each tracking representative point P being the tracking representative point P of the tracking object, and may be calculated based on a characteristic amount of the tracking object and characteristic amounts of the respective objects located within the selected region S(n). As the characteristic amount used here, the echo area of the object may be cited as an example.

The associating submodule 14 may set a threshold $Na_n$ (n=1, 2, ...) corresponding to each likelihood $Lh_n$. Further, the associating submodule 14 may compare the likelihood $Lh_n$ of each tracking representative point P with the corresponding threshold $Na_n$, and determine whether the tracking representative point P can be a candidate for the tracking representative point P of the tracking object based on the comparison result. For example, when the likelihood $Lh_n$ of a certain tracking representative point P located within the selected region S(n) is equal to or higher than the threshold $Na_n$, the associating submodule 14 may determine that the tracking representative point P can be a candidate for the tracking representative point P of the tracking object. On the other hand, when the likelihood $Lh_n$ of the certain tracking representative point P is lower than the threshold $Na_n$, the tracking representative point P is excluded from the candidates for the tracking representative point P of the tracking object.

Here, the associating submodule 14 may determine the value of the threshold $Na_n$ based on the value of the smoothed congestion degree Cs(n). Specifically, for example, when the smoothed congestion degree Cs(n) is equal to or higher than a given threshold $N_5$, the associating submodule 14 may increase the value of the threshold $Na_n$. On the other hand, when the smoothed congestion degree Cs(n) is lower than the given threshold $N_5$, the value of the threshold $Na_n$ may be reduced.

The motion estimating submodule 15 may be configured to perform tracking processing of the tracking object 140 on the XY coordinate system. In this embodiment, the motion estimating submodule 15 may perform the tracking processing of the tracking object 140 by using a coordinate system of which orientation with respect to the surface of the earth is constant.

The motion estimating submodule 15 may be provided to smooth the influence of an observation error (an error caused by a positional deviation etc. which occurs when the antenna 5 rotates). In this embodiment, the motion estimating submodule 15 may perform α-β filtering as tracking filtering. The motion estimating submodule 15 may be configured to calculate the estimated position Xp(n), a smoothed position Xs(n), and the smoothed velocity Vs(n) of the tracking object 140.

For example, the motion estimating submodule 15 may solve the following Equations 3, 4 and 5.

$$\text{Estimated position } Xp(n)=Xs(n-1)+T \times Vs(n-1) \quad (3)$$

$$\text{Smoothed position } Xs(n)=Xp(n)+\alpha\{Xo(n)-Xp(n)\} \quad (4)$$

$$\text{Smoothed velocity } Vs(n)=Vs(n-1)+(\beta/T)\{Xo(n)-Xp(n)\} \quad (5)$$

Note that the smoothed position Xs(n) may indicate the position associated with the estimated position Xp(n) and the observed position Xo(n) at the n-th scan timing. The smoothed position Xs(n) may indicate the position where the tracking representative point P1 of the tracking object 140 is estimated to reach at the n-th scan timing. Further, the smoothed velocity Vs(n) may indicate an estimated velocity of the tracking representative point P1 at the n-th scan timing.

Further, "T" may indicate elapsed time until the motion estimating submodule 15 performs the above smoothing from when it performed smoothing immediate previous thereto, which corresponds to the time required for a single scan. Moreover, "α" may be a gain used for calculating the smoothed position Xs(n). "β" may be a gain used for calculating the smoothed velocity Vs(n).

The gain α may have a component αx in the X-axis direction and a component αy in the Y-axis direction. The gain α may also be expressed as a gain α(αx, αy). The component αx may be used in calculating the component in the X-axis direction in Equation 4 described above. The component αy may be used in calculating the component in the Y-axis direction in the Equation 4 described above.

Further, the gain β may have a component βx in the X-axis direction and a component βy in the Y-axis direction. The gain β may also be expressed as the gain β(βx, βy). The component βx may be used in calculating the component in the X-axis direction in the Equation 5 described above. Moreover, the component βy may be used in calculating the component in the Y-axis direction in the Equation 5 described above The smoothed position Xs(n) may be located on a line segment LS1 connecting the estimated position Xp(n) and the observed position Xo(n).

According to the above configuration, the smoothed position Xs(n) may approach the estimated position Xp(n) as the gain α decreases. Further, the change amount of the smoothed velocity Vs(n) may become smaller as the gain β decreases. Therefore, the degree of smoothing of the calculation result obtained by the motion estimating submodule 15 may become large and a variation amount due to the observation error of the tracking object 140 may become small. However, a response for reflecting a course changing motion of the tracking representative point P1 of the tracking object 140 in the calculation result of the motion estimating submodule 15 may delay as the gains α and β become smaller.

On the other hand, the smoothed position Xs(n) may approach the observed position Xo(n) as the gain α increases. Further, the degree of smoothing of the smoothed velocity Vs(n) may become smaller as the gain β increases. Therefore, the motion estimating submodule 15 may reflect the course changing motion of the tracking representative point P1 of the tracking object 140 with good responsiveness in the tracking filtering. Therefore, the motion estimating submodule 15 may enhance followability to the course changing motion of the tracking object 140. Note that the course changing motion may mean a motion of changing the orientation of the tracking object 140. Note that a fluctuation amount of the smoothed position Xs(n) and the smoothed velocity Vs(n) at every scan timing may become larger as the gains α and β increase.

Then, the motion estimating submodule 15 may set the values of the gains α and β based on the value of the smoothed congestion degree Cs(n) notified from the congestion degree calculating submodule 22. For example, the gains α and β may be expressed as follows, according to the relationship between the threshold $N_1$ to $N_3$ ($0<N_3<N_2<N_1$) and the smoothed congestion degree Cs(n).

$$\alpha=\beta=0 \text{ (if } N_1<Cs(n))$$

$$\alpha=0.5\alpha_1, \beta=0.5\beta_1 \text{ (if } N_2<Cs(n)\leq N_1)$$

$$\alpha=\alpha_1, \beta=\beta_1 \text{ (if } N_3<Cs(n)\leq N_2)$$

$$\alpha=1.5\alpha_1, \beta=1.5\beta_1 \text{ (if } Cs(n)\leq N_3)$$

Note that $\alpha_1$ and $\beta_1$ may be given constants.

By setting the values of the gains α and β based on the smoothed congestion degree Cs(n) as described above, the following effects may be obtained.

When the smoothed congestion degree is extremely high ($N_1<Cs(n)$ in this embodiment), a large number of objects may be estimated to be located near the estimated position of the tracking object. In this case, when the associating submodule 14 performs the association, there may be a high possibility that the tracking target swaps from the object desired to be tracked originally to another object (possibility of a so-called swap). Therefore, under such a situation where there is a high possibility of the swap, the swap of the tracking target may be prevented by setting the gains α and β to 0 and performing so-called estimation tracking. Note that the estimation tracking means a tracking method with which when calculating the smoothed position Xs(n), the estimated position Xp(n) is calculated as a smoothed position without considering the observed position Xo(n).

When the smoothed congestion degree is slightly high ($N_2<Cs(n)\leq N_1$ in this embodiment), a relatively large number of objects may be estimated to be located near the estimated position of the tracking object. In this case, the possibility of the swap may somewhat increase when the associating submodule 14 performs the association. Therefore, under such a condition where the possibility of the swap is somewhat high, the tracking processing which is close to the so-called estimation tracking may be performed by setting the gains α and β to somewhat low values ($\alpha=0.5\alpha_1, \beta=0.5\beta_1$ in this embodiment). Thus, the tracking processing which is applicable to the course changing motion of the tracking target to some extent while reducing the possibility of the swap of the tracking target may be carried out.

On the other hand, when the smoothed congestion degree is close to 0 ($Cs(n)\leq N_3$ in this embodiment), it may be estimated that only few objects or no object is located near the estimated position of the tracking object. In this case, since the risk of the swap described above is extremely low, by setting the values of the gains α and β to higher values ($\alpha=1.5\alpha_1, \beta=1.5\beta_1$) than usual, tracking processing which enhances the followability to the course changing motion of the tracking object may be performed.

Note that, when the smoothed congestion degree is $N_3<Cs(n)\leq N_2$, the gains α and β may be set to values so that the reduction of the swap risk of the tracking target and the securing of followability to the tracking object are both suitably balanced ($\alpha=\alpha_1, \beta=\beta_1$).

The motion estimating submodule 15 may output each data calculated by using the gains α and β which are suitably set based on the smoothed congestion degree as described above, to the selecting submodule 13, the congestion degree calculation processing module 20, and the display unit 4. For example, the motion estimating submodule 15 may output the coordinate data of the estimated position Xp(n) to the selecting submodule 13 and the congestion degree calculation processing module 20. The selecting submodule 13 may use the data the selection at a (n+1)-th scan timing. On the other hand, the congestion degree calculation processing module 20 may use the data to specify the cell B which is a calculation target of the congestion degree. In addition, motion estimating submodule 15 may output the data indicating the smoothed position Xs(n) and the smoothed velocity Vs(n) to the display unit 4.

The display unit 4 may be, for example, a liquid crystal display capable of color display. The display unit 4 may display each object echo image 120 on the display screen by using the image data of the object echo image 120. Further, the display unit 4 may display the smoothed velocity Vs(n) as an image. Thus, on the display screen of the display unit 4, the image indicating the smoothed velocity Vs(n) of the tracking object 140 (object echo image 121) may be displayed. An operator of the radar apparatus 1 can confirm the motion state of the tracking object 140 by confirming the radar image displayed on the display unit 4.

Effects

As described above, in the tracking processor 3 of this embodiment, the tracking processing module may perform the tracking processing based on the congestion degree (the smoothed congestion degree Cs(n) in this embodiment) of the objects located within the area including the estimated position Xp(n) of the tracking object 140 (the cell B in this embodiment). In this manner, the tracking processing may suitably be controlled according to the possibility that the tracking target swaps from the object desired to be tracked originally to another object (possibility of the swap). For example, in this embodiment, since the estimation tracking is performed under the situation where the possibility of the swap is high, i.e., the smoothed congestion degree Cs(n) is high, the swap may be prevented. On the other hand, in a situation where the possibility of the swap is low, i.e., the smoothed congestion degree Cs(n) is low, the tracking processing with a high followability to the course changing motion of the tracking object may be performed.

Therefore, according to the tracking processor 3, the tracking target may accurately be tracked regardless of a surrounding environment.

Further, since the tracking processor 3 calculates the congestion degree (smoothed congestion degree Cs(n)) based on the number of objects located within the area including the estimated position Xp(n) of the tracking object 140, the congestion degree may suitably be calculated.

Further, the tracking processor 3 may calculate the congestion degree (smoothed congestion degree Cs(n)) of the cell B including the estimated position Xp(n) of the tracking target among the plurality of cells B formed by dividing the given area A. Thus, the tracking of the tracking target may be performed based on the congestion degree calculated for the relatively limited region including the tracking target, and as a result, the tracking target may be tracked more accurately.

Further, according to the tracking processor 3, the congestion degree may be calculated based on the numbers of objects obtained a plurality of timings. In this manner, for example, the numbers of objects of which echo intensities are close to the threshold based on which the echo intensity is calculated to be of an object may be averaged over time, and thus, a significant fluctuation of the degree of congestion at each timing may be reduced.

Further in the tracking processor 3, the smoothed congestion degree may be calculated based on the congestion degrees at a plurality of timings. In this manner, similar to the case described above, the numbers of objects of which echo intensities are close to the threshold based on which the echo intensity is calculated to be of an object may be averaged over time, and thus, the significant fluctuation of the degree of congestion at each timing may be reduced.

Further in the tracking processor 3, the gains $\alpha$ and $\beta$ used for performing the tracking filtering may be set based on the value of the smoothed congestion degree Cs(n). For example, the gains $\alpha$ and $\beta$ may be set to low values when the possibility of the swap is high (when the smoothed congestion degree Cs(n) is high), therefore the so-called estimation tracking may be performed. As a result, the possibility that tracking target swaps from the object desired to be tracked originally to another object may be reduced. On the other hand, the gains $\alpha$ and $\beta$ may be set to high values when the possibility of the swap is low (when the smoothed congestion degree Cs(n) is low). As a result, the tracking processing with the high followability to the course changing motion of the tracking object may be performed.

Further in the tracking processor 3, the area of the selected region S(n) may be set based on the value of the smoothed congestion degree Cs(n). For example, the area of the selected region S(n) may be set small when the possibility of the swap is high (when the smoothed congestion degree Cs(n) is high). Thus, since the candidates for the objects which can be the tracking target are narrowed down, the risk of the swap may be reduced. On the other hand, when the possibility of the swap is low (when the smoothed congestion degree Cs(n) is low), the area of the selected region S(n) is set large. Thus, since a tracking object of which course is greatly changed can also be a candidate for the objects which can be the tracking target, the tracking processing with the high followability to the course changing motion of the tracking object may be performed.

Further in the tracking processor 3, the value of the threshold $Na_n$ used by the associating submodule 14 may be set based on the value of the smoothed congestion degree Cs(n). When the possibility of the swap is high (when the smoothed congestion degree Cs(n) is high), the value of the threshold $Na_n$ may be set high. Thus, since the candidates for the objects which can be the tracking target are narrowed down, the risk of the swap may be reduced. On the other hand, when the possibility of the swap is low (when the smoothed congestion degree Cs(n) is low), the threshold $Na_n$ may be set low. Thus, since a tracking object of which course is greatly changed can also be a candidate for the objects which can be the tracking target, the tracking processing with the high followability to the course changing motion of the tracking object may be performed.

MODIFICATIONS

Although the embodiment of this disclosure is described above, this disclosure is not limited thereto and various changes may be made without departing from the scope of this disclosure.

(1) In the above embodiment, the number of objects counted in a certain scan may be set as the number of objects corresponding to the scan; however, this disclosure is not limited to this. For example, a value obtained by averaging the number of objects counted in the scan and the numbers of objects counted in other scans before and after the scan concerned may be used as the number of objects corresponding to the scan.

(2) In the above embodiment, the values of the gains $\alpha$ and $\beta$ may be set in a stepwise fashion according to the relationship between the value of the smoothed congestion degree Cs(n) and the values of the thresholds $N_1$ to $N_3$; however, this disclosure is not limited to this. For example, the values of the gains $\alpha$ and $\beta$ may be set so that the values of the gains $\alpha$ and $\beta$ linearly change corresponding to the value of the smoothed congestion degree Cs(n). The values of the gains $\alpha$ and $\beta$ may be expressed as follows, for example.

$$\alpha = v \cdot \alpha_2$$

$$\beta = v \cdot \beta_2$$

Note that, $v=0$ when $N_1 < Cs(n)$, and $v = 1-(Cs(n)-N_2)/(N_1-N_2)$ when $N_1 \geq Cs(n)$. Additionally, $\alpha_2$ and $\beta_2$ may be given constants.

Setting the gains $\alpha$ and $\beta$ by using the equations described above causes the values of the gains $\alpha$ and $\beta$ when the value of the smoothed congestion degree Cs(n) is equal to or higher than $N_1$ to linearly change corresponding to the value of the smoothed congestion degree Cs(n). Thus, the gains $\alpha$ and $\beta$ may be set more suitably based on the value of the smoothed congestion degree Cs(n).

Further in the above embodiment, the range of the selected region S(n) may be set in a stepwise fashion according to the relationship between the value of the smoothed congestion degree Cs(n) and the threshold $N_4$; however, this disclosure is not limited to this. For example, similar to the case described above, the range of the selected region S(n) may be set so as to linearly change corresponding to the value of the smoothed congestion degree Cs(n).

Figure 7:
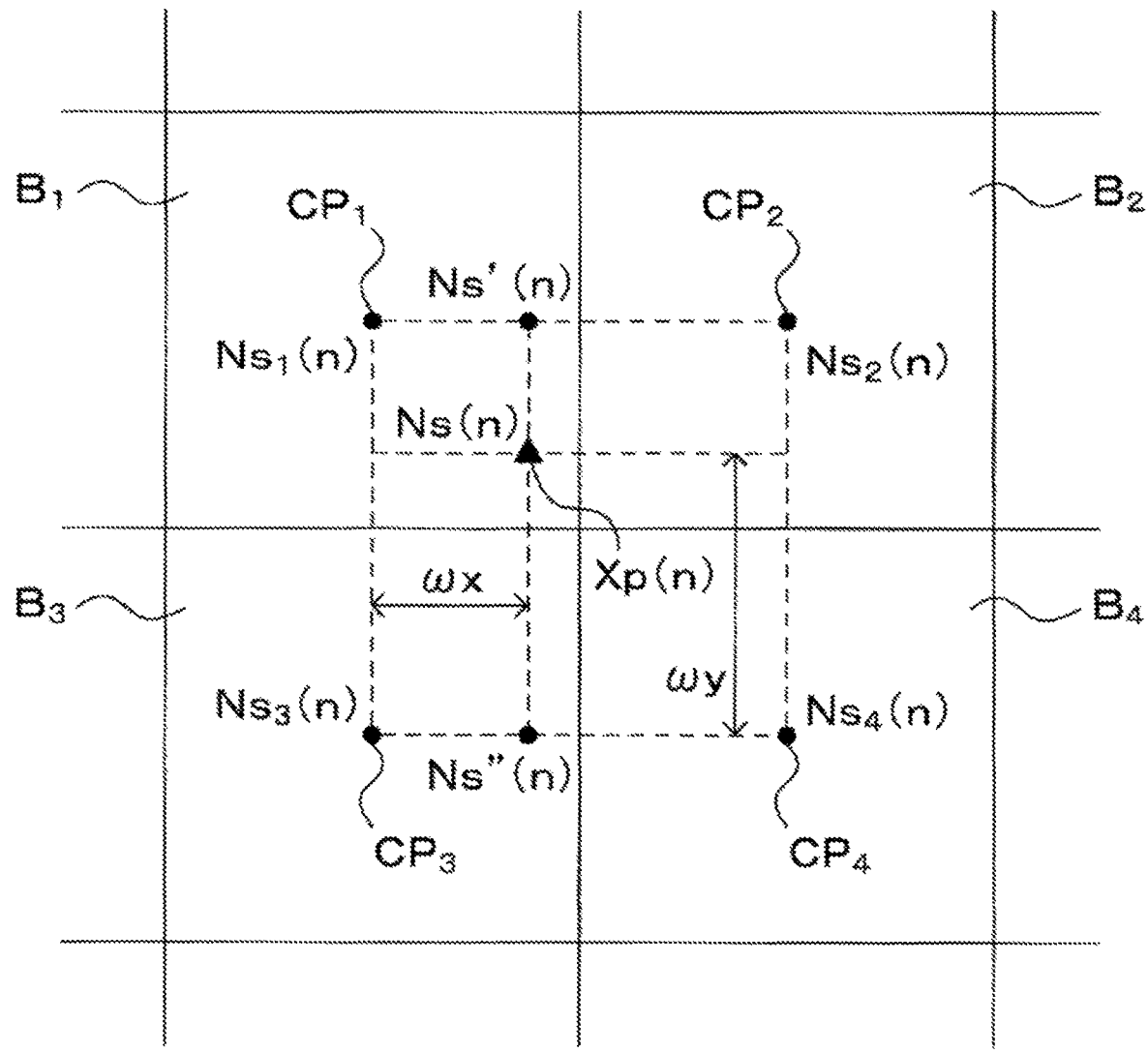
FIG. 7 is a schematic view illustrating a method of calculating a congestion degree by a congestion degree calculating submodule of a tracking processor according to one modification.

(3) FIG. 7 is a schematic view illustrating a method of calculating a congestion degree by the congestion degree calculating submodule 22 of the tracking processor according to one modification. FIG. 7 illustrates one of the plurality of cells B (see FIG. 6) which is located near the estimated position Xp(n) of the tracking object. In the above embodiment, the smoothed number of objects Ns(n) in the cell B including the estimated position Xp(n) of the tracking object may be calculated as the congestion degree C(n); however, this disclosure is not limited to this. In this modification, the congestion degree C(n) may be calculated using a linear interpolation.

In this modification, when the congestion degree calculating submodule 22 calculates the congestion degree C(n), among the smoothed numbers of objects Ns(n) stored corresponding to the plurality of cells B, the smoothed numbers of objects Ns(n) of the cells B which satisfies the following condition may be used. For example, with reference to FIG. 7, the congestion degree C(n) may be calculated based on the following Equation 6, by using the smoothed numbers of objects Ns(n) ($Ns_1(n)$ to $Ns_4(n)$ in FIG. 7) stored corresponding to respective four cells B ($B_1$ to $B_4$ in FIG. 7) which form, by their center points $CP_1$ to $CP_4$, a substantially square region which includes the estimated position Xp(n). Further, similar to the above embodiment, the congestion degree calculating submodule 22 of this modification may store the smoothed congestion degree C(n) calculated in the latest scan, in replacement of the smoothed congestion degree C(n−1) stored so far.

$$C(n)=Ns'(n)\cdot \omega y+Ns''(n)\cdot (1-\omega y) \quad (6)$$

Note that, $$Ns'(n)=Ns_1(n)\cdot (1-\omega x)+Ns_2(n)\cdot \omega x, \text{ and}$$

$$Ns''(n)=Ns_3(n)\cdot (1-\omega x)+Ns_4(n)\cdot \omega x.$$

Here, "ωx" may be a ratio of an x-axis direction component of a distance from $CP_1$ to Xp(n) (that is, an x-axis direction component of a distance from $CP_3$ to Xp(n)) with respect to a distance from $CP_1$ to $CP_2$ (that is, a distance from $CP_3$ to $CP_4$). "ωy" may be a ratio of a y-axis direction component of a distance from $CP_3$ to Xp(n) (that is, a y-axis direction component of a distance from $CP_4$ to Xp(n)) with respect to a distance from $CP_1$ to $CP_3$ (that is, a distance from $CP_2$ to $CP_4$).

The smoothed congestion degree C(n) calculated as described above may be notified to the tracking processing module 11 similar to the above embodiment. The tracking processing module 11 may perform tracking processing based on the value of the smoothed congestion degree C(n) also similar to the above embodiment.

As described above, according to the tracking processor of this modification, similar to the tracking processor of the above embodiment, the tracking target may accurately be tracked regardless of the surrounding environment.

Further, according to the tracking processor of this modification, since the congestion degree may be calculated using the linear interpolation, the congestion degree of the objects may be calculated more accurately.

(4) In the above embodiment, the smoothed number of objects Ns(x, y, n) in the cell B including the estimated position Xp(n) of the tracking object may be calculated as the congestion degree C(n); however, this disclosure is not limited to this. For example, the number of objects N(x, y, n) in the n-th scan may be calculated as the congestion degree C(n) without calculating the smoothed number of objects.

(5) In the above embodiment and modifications, the range of the selected region S(n), the values of the gains α and β, and the value of the threshold $Na_n$ may be controlled according to the smoothed congestion degree (or the congestion degree); however, without limiting to this, these range and values may be controlled arbitrarily as long as at least one of them is controlled as a variable according to the congestion degree.

DESCRIPTION OF REFERENCE CHARACTERS

1 Radar Apparatus
3 Tracking Processor
11 Tracking Processing Module
22 Congestion Degree Calculating Submodule

The invention claimed is:
1. A radar apparatus, comprising:
an antenna configured to:
  transmit a pulse-shaped radio wave, and
  receive an echo signal which is a reflection wave from an object; and
processing circuitry configured to:
  detect an observed position;
  perform processing of tracking a target; and
  calculate a degree of congestion of objects located within an area including an estimated position of the target,
  wherein the processing circuitry is further configured to:
  calculate a smoothed position Xs(n) by a weighting addition of the observed position Xo(n) and the estimated position Xp(n) estimated based on the smoothed position Xs(n−1), and
  change a rate of the weighting addition based on the degree of congestion, and
  wherein the processing circuitry decreases the rate of weighting addition of the observed position Xo(n) as the degree of congestion of objects increases.

2. The radar apparatus of claim 1, wherein the processing circuitry calculates the degree of congestion based on the number of objects located within the area.

3. The radar apparatus of claim 2, wherein the processing circuitry is configured to count the number of objects located in a plurality of cells formed by dividing the area on a single cell basis, and store the number of objects counted for each of the plurality of cells in association with the cell,
wherein the processing circuitry calculates the degree of congestion of the objects located in the cell including the estimated position of the target.

4. The radar apparatus of claim 2, wherein the processing circuitry calculates the degree of congestion based on the numbers of objects obtained at a plurality of timings.

5. The radar apparatus of claim 1, wherein the processing circuitry calculates a smoothed congestion degree (Cs) based on congestion degrees (Cs) obtained at a plurality of timings (n) according to the formula $Cs(n)=a_2\cdot C(n)+(1-a_2)\cdot Cs(n-1)-1$, and
wherein the processing circuitry performs the processing of tracking the target based on the smoothed congestion degree (Cs).

6. The radar apparatus of claim 1, wherein the processing circuitry sets, based on the degree of congestion, a gain used in performing tracking filtering on the observed position obtained by observing the target.

7. The radar apparatus of claim 6, wherein the processing circuitry is configured to specify a selected region where the observed position obtained by observing the target is estimated to be located, and
wherein the processing circuitry sets the area of the selected region based on the value of the degree of congestion.

8. A method of tracking processing, comprising:
detecting, by an echo detecting module, an observed position;
performing, by a tracking processing module, processing of tracking a target; and
calculating, by a congestion degree calculating module processing in parallel with the tracking processing module, a degree of congestion of objects located within an area including an estimated position of the target,
wherein the performing the processing of tracking the target includes:
  calculating a smoothed position Xs(n), the smoothed position Xs(n) being a position which is calculated by a weighting addition of the observed position Xo(n) and the estimated position Xp(n) estimated based on the smoothed position Xs(n−1), and changing a rate of the weighting addition based on the congestion degree calculated by the congestion degree calculating module, and wherein the rate of weighting addition of the observed position Xo(n) is decreased as the degree of congestion of objects increases.

* * * * *